Patented Aug. 25, 1942

2,293,901

UNITED STATES PATENT OFFICE 2,293,901

ACTIVATED ADSORBENT AND ITS TREATMENT

Arthur J. L. Hutchinson, Los Angeles, Calif., assignor to The Fluor Corporation, Ltd., Los Angeles, Calif., a corporation of California No Drawing. Application May 6, 1941, Serial No. 392,185

7 Claims. (Cl. 183—4)

This invention has to do with the art of adsorptive materials, especially activated adsorbents, and their use for such purposes as the dehydration of hydrocarbon gases generally and of which natural gas may be taken as typical. In its more particular aspects, the invention aims to provide certain improvements in the composition, preparation and use of adsorptive materials capable of acquiring combined water, as hereinafter defined, for the dehydration of gases, resulting in the protection of the adsorbent against becoming fouled or poisoned by the adsorption of liquids or polymers in the gas and without affecting to any appreciable degree the dehydrating capacity of the adsorbent.

It has been customary practice to subject natural gas to dehydration by contacting the gas with adsorptive materials by which the moisture removed from the gas is retained as combined water. Aside from their chemical composition and capacity for taking on combined water, these adsorptive materials are used by reason of their greater dehydrating efficiencies resulting from their porous, and therefore extended surface areas presenting correspondingly increased surfaces of the material to contact the gas, and also from their condition resulting from a state of activation. The principal, though typical, adsorptve materials of this character now in use are the hydrates of alumina ($Al_2O_3.H_2O$, $Al_2O_3.2H_2O$, $Al_2O_3.3H_2O$), of silica ($SiO_2.xH_2O$), and of the iron oxide ($Fe_2O_3.xH_2O$). Most generally, these are activated adsorbents, although the alumina hydrate $Al_2O_3.2H_2O$ occurs in natural bauxite, and may have in their normal or activated condition, varying degrees of hydration or molecules of combined water. All, however, are capable of acquiring added combined water, by which I mean an additional molecule or molecules of water chemically held by the metallic oxide in the form of combined water, as it is known in chemistry.

Either or both the porous form and activated condition of these adsorptive materials gives them a property which, for the purpose of practical gas dehydration, is seriously detrimental to the continued dehydrating efficiency of the adsorbent, particularly where the effect of the activation is to increase the catalyzing and polymerizing powers of the adsorbent and its tendency to hold contaminating bodies. By reason of its porosity and state of activation, the material acts as an efficient adsorbent of the heavier constituents of the gas, including any oil particles as well as vaporized higher boiling fractions, and since most natural gas, even after passage through separators or scrubbers, ordinarily will be found to carry substantial amounts of oil and other high boiling point compounds in the vapor phase, it is evident that up to a degree of saturation, the adsorptive material will retain most of the heavier or higher boiling constituents coming in contact with it. These adsorbents also are efficient polymerizing catalysts, and where the gas carries unsaturated polymerizable hydrocarbons, the adsorbent may accumulate large quantities of liquid and oftentimes gummy polymers. The adsorbed heavier hydrocarbons, whether retained by the adsorbent in liquid or vapor phases, film the adsorbent material and impair its moisture removing (hydrate-forming) capacity, by preventing access of moisture to the surfaces of the material. Also the adsorbed heavier hydrocarbons, hereinafter referred to as the contaminating hydrocarbons, tend to fill the pores of the adsorbent, thereby "poisoning" it by causing the adsorbent to lose the advantages of its activated form and condition, since the contaminants prevent the gas from contacting the pore surfaces, and correspondingly impair the moisture-removing efficiency of the material.

Briefly stated, my general object is to wholly or materially in part, nullify the adsorptiveness of the material as to the contaminating hydrocarbons, without impairing at least to a degree of practical consequence its hydrating capacity. This object is accomplished by incorporating in the adsorptive material a substance which wholly or at least largely fills the pores and thereby correspondingly nullifies the adsorptiveness of the material for contaminating hydrocarbons. The pore-impregnating substance, is however of a nature such that it will not interfere with the activity of the adsorptive material with respect to its capacity and total surface effectiveness for removing moisture from the gas. Consequently, I am able to retain the advantages of the activated state of the material for purposes of gas dehydration, and to obviate the disadvantages of its normal adsorptiveness of contaminating hydrocarbons.

Another purpose served by the protective substance is to prevent the dehydrating material from becoming poisoned by sulphur-containing constituents of the gas, or by decomposition products of such constituents resulting from catalytic action of the dehydraing material. To illustrate, hydrocarbon gases commonly contain sulphur compounds such as hydrogen sulphide, mercaptans, organic sulphides, and the like. Normally, the dehydrating material may act catalytically to dissociate some sulphur compounds so as to leave, for example, elemental sulphur deposited as a poisoning agent on the surface or in the pores of the dehydrating material. The effect on other sulphur compounds, such as mercaptans, may be to deplete them of sulphur and cause formation of gums or hydrocarbon polymers. Such contaminations of the dehydrating material may be prevented by the invention, in that the protective substance can prevent or minimize contact of the material by such sulphur compounds as well as hydrocarbon constituents of the gas.

This adsorbent protective substance is selected to have certain property, among others, of being non-repellent of moisture and unaffected by oil or moisture in a way detrimental to accessibility of the moisture to the adsorbent. I may use a protective substance that in itself is neutral, i. e. stable, chemically or physically in the presence of water or oil, although it may be desirable for the substance to have hygroscopic properties so that it will attract moisture and draw it toward the surface of the adsorbent. It will be understood that the invention broadly contemplates the use of any suitable protective substance, or mixture of such substances, and that they may either be organic or inorganic in nature. Certain organic substances lend themselves particularly well for this purpose in that they may serve as colloidal coatings for protecting the adsorptive material. I refer here typically to such substances as gelatin, soaps, starch and glycogen. Among the inorganic compounds, I may use any suitable one or mixture of the neutral salts that do not form natural hydrates capable of dissolving in their own water of hydration, for example alkaline earth metal chlorides such as sodium chloride and potassium chloride.

The protective substances may be applied to or incorporated in the adsorbent material by any suitable method resulting in an adequately thorough admixture of the materials and properly uniform distribution of the protective substances over the surfaces or within the pores of the adsorbent. For example, the protective substances may be applied to the adsorbent by suitable methods of percolation, or by spraying and agitating the materials until a thorough admixture results. In order to obtain greater uniformity in the distribution and penetration of the protective substances over the surfaces of the adsorbent, the former may be applied, where in liquid form, in heated condition, or in a solvent or thinner, and the solvent or thinner evaporated by heating the coated adsorbent.

The invention is not primarily concerned with any particular method of bringing the gas to be dehydrated into contact with the protected adsorbent. To give a typical illustration, however, a stationary bed of the adsorbent may be placed in a dehydrating chamber through which the wet gas is passed at a suitable rate of flow, and under temperature and pressure conditions known to those familiar with the art, permitting the dew point of the gas to be reduced to the desired temperature, say in the neighborhood of 20° F. The normal adsorptiveness of the material for contaminating hydrocarbons being nullified by the presence of the protective substances, the adsorbent charge in a single dehydrating chamber will be found to retain its hydrating capacity and gas dehydrating efficiency, over a period of time greatly extended beyond the normal period of operation permissible when using the ordinary unprotected adsorbents. At such time as the adsorbent acquires combined water to the point of losing its gas dehydrating efficiency the adsorbent may be dehydrated and revived with respect to its gas dehydrating capacity, by any of the usual methods and without necessity for removing or otherwise interfering with the protective substance. For example, dehydration (driving off combined water) of the adsorbent may be accomplished by discontinuing the flow of natural gas through the bed of adsorbent, and passing through the adsorbent for a suitable length of time a heated gas at around 300 to 400 F., such as flue gas, air, superheated steam or dehydrated natural gas. After dehydration of the adsorbent, the unit again may be put on stream for gas dehydration over a successive period.

I claim:

1. The process of dehydrating hydrocarbon gases, that includes contacting the gas with porous adsorptive material capable of acquiring combined water from the gas, said material carrying a protective coating substance preventing access to pore surfaces of the material of constituents of the gas normally tending to impair the dehydrating effectiveness of such surfaces by depositing thereon a contaminant of the group consisting of higher boiling hydrocarbons and polymers, while permitting ready passage of moisture through said protective substance into contact with the pore surfaces of the material.

2. The process of dehydrating hydrocarbon gases, that includes contacting the gas with porous adsorptive material capable of acquiring combined water from the gas, the pore surfaces of said material being coated with a moisture-passing stable substance preventing access to said pore surfaces of constituents of the gas normally tending to impair the dehydrating effectiveness of such surfaces by depositing thereon a contaminant of the group consisting of higher boiling hydrocarbons and polymers, while permitting ready passage of moisture through said substance into contact with the pore surfaces of the material.

3. The process of dehydrating hydrocarbon gases, that includes contacting the gas with a porous adsorptive and partially hydrated metallic oxide capable of acquiring combined water from the gas, said oxide carrying a protective coating substance preventing access to the surfaces of the oxide protected by said substance of constituents of the gas normally tending to impair the dehydrating effectiveness of such surfaces by depositing thereon a contaminant of the group consisting of higher boiling hydrocarbons and polymers, while permitting ready passage of moisture through said protective substance into contact with the protected surfaces of the oxide.

4. The process of dehydrating hydrocarbon gases, that includes contacting the gas with a partially hydrated activated adsorptive metallic oxide of the group consisting of $Al_2O_3$, $SiO_2$, and $Fe_2O_3$, and capable of acquiring combined water from the gas, said oxide carrying a protective coating substance preventing access to pore surfaces of the oxide of constituents of the gas normally tending to impair the dehydrating effectiveness of such surfaces by depositing thereon a contaminant of the group consisting of higher boiling hydrocarbons and polymers, while permitting ready passage of moisture through said substance into contact with the pore surfaces of the oxide.

5. The process of dehydrating hydrocarbon gases, that includes contacting the gas with porous adsorptive material capable of acquiring combined water from the gas, said material carrying a protective coating substance preventing access to pore surfaces of the material of constituents of the gas normally tending to impair the dehydrating effectiveness of such surfaces by depositing thereon a contaminant of the group consisting of higher boiling hydrocarbons and polymers, while permitting ready passage of moisture through said protective substance into contact with the pore surfaces of the material, and driving off combined water from the hydrated material without removing said protective substance therefrom.

6. The process of dehydrating hydrocarbon gases, that includes contacting the gas with a partially hydrated porous metallic oxide capable of acquiring combined water from the gas, said oxide carrying a protecting coating substance preventing access to the surfaces of the oxide protected by said substance of constituents of the gas normally tending to impair the dehydrating effectiveness of such surfaces by depositing thereon a contaminant of the group consisting of higher boiling hydrocarbons and polymers, while permitting ready passage of moisture through said protective substance into contact with the protected surfaces of the oxide, and driving off combined water from the hydrated oxide without removing said protective substance therefrom.

7. The process of dehydrating hydrocarbon gases, that includes contacting the gas with a partially hydrated activated adsorptive metallic oxide of the group consisting of $Al_2O_3$, $SiO_2$, and $Fe_2O_3$, and capable of acquiring combined water from the gas, said oxide carrying a protective coating substance preventing access to pore surfaces of the oxide of constituents of the gas normally tending to impair the dehydrating effectiveness of such surfaces by depositing thereon a contaminant of the group consisting of higher boiling hydrocarbons and polymers, while permitting ready passage of moisture through said substance into contact with the pore surfaces of the oxide, and driving off combined water from the hydrated oxide without removing said protective substance therefrom.

ARTHUR J. L. HUTCHINSON.